Jan. 19, 1943.  E. SCHELER  2,308,935

AIRCRAFT WING

Filed June 13, 1940

*Inventor:*
EMIL SCHELER
By: Richards & Geier
Attorneys

Patented Jan. 19, 1943

2,308,935

UNITED STATES PATENT OFFICE 2,308,935

AIRCRAFT WING

Emil Scheler, Vegesack, near Bremen, Germany; vested in the Alien Property Custodian Application June 13, 1940, Serial No. 340,335
In Germany April 17, 1939

3 Claims. (Cl. 244—124)

This invention relates to an aircraft wing which is built up around a single spar in the form of a hollow closed body constructed to resist bending and twisting forces and comprises also front and rear wing parts completely enclosing the spar and secured thereto, which may or may not be subdivided in the longitudinal direction of the wing, the ribs of said wing parts being easily attachably and detachably fastened to the spar and the skin, between said front and rear parts, forming joints that extend transversely to the direction of flight and are preferably located at the rear wall of the spar.

The present invention aims to simplify the structure of the front and rear wing parts and to insure the easy and quick arrangement and storing of fuel tanks, bomb dropping apparatus, etc., in the wing. For this purpose, auxiliary supports of tubular or other form are firmly or detachably connected at a few points to the spar by means of brackets, etc. and the front and rear parts whose skin-supporting ribs are interconnected near the spar by longitudinal sections extending in the direction of the longitudinal axis of the wing are pushed over the auxiliary supports and at some points detachably secured to the spar. The brackets, etc. connecting the auxiliary supports to the spar can be constructed so as to hold also ailerons, landing flaps, slats, fuel tanks, bomb dropping apparatus, etc. The main portion of the forces acting upon the wing, particularly the bending moments, are then taken up by the auxiliary supports and transmitted to the spar by the brackets, etc. As the ribs supporting the skin of the front and rear wing parts have to take up only relatively small forces, they can be made in a particularly simple manner.

Figure 1:
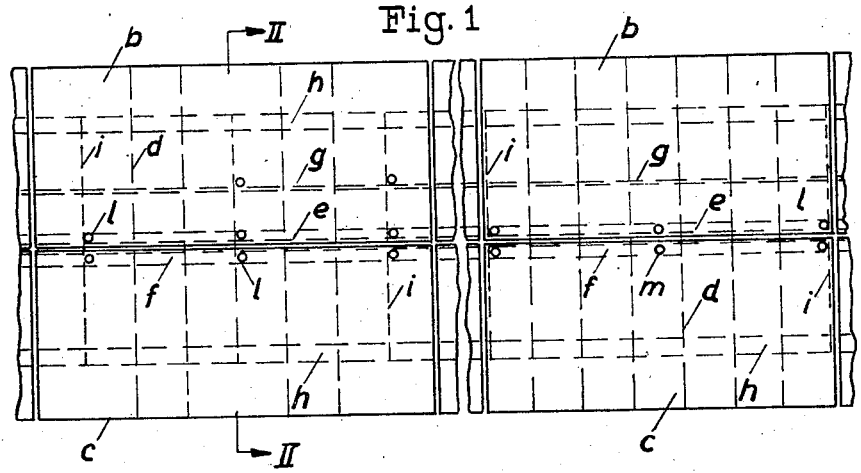
Figure 2:
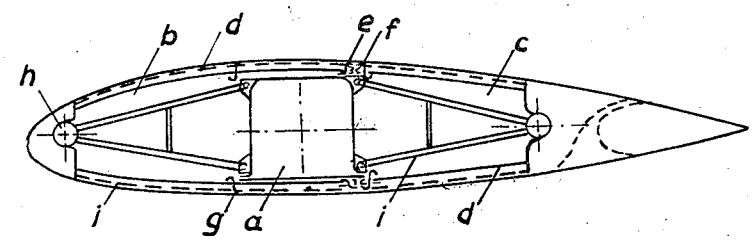
Figure 3:
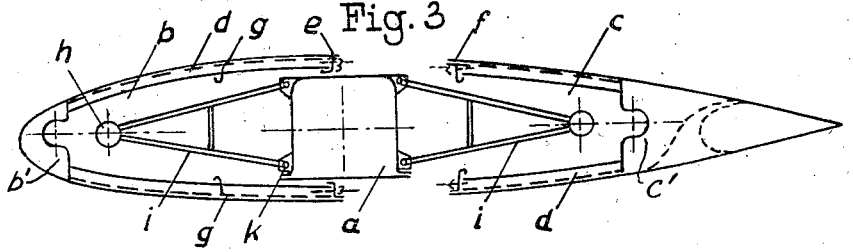
Figure 4:
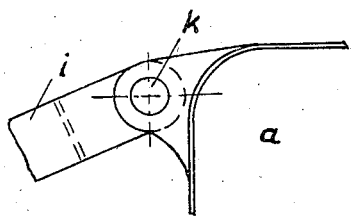

The invention is illustrated by way of example in the accompanying drawing, in which Figure 1 is a plan of a portion of a wing constructed according to the invention;

Fig. 2, a cross section thereof on the line II—II, of Fig. 1;

Fig. 3, a cross section thereof with the front and rear parts removed from the spar; and Fig. 4, a detail view of a connection on an enlarged scale.

Referring to the drawing, $a$ designates a spar having the form of a closed hollow body capable of resisting bending and twisting forces, and $b$ and $c$ are, respectively, the front and rear parts. The skins of the front and rear parts $b$, $c$ are supported by ribs $d$ which, at the joint located near the rear wall of the spar $a$, are interconnected by longitudinal sections $e$, $f$ extending in the direction of the longitudinal axis of the wing and, near the front wall of the spar, by longitudinal sections $g$ firmly connected also to the skins. To the spar $a$ auxiliary supports $h$, which in the embodiment shown are of tubular construction, are connected at a few points $k$ by brackets $i$, preferably in an easily detachable manner, and upon these auxiliary supports $h$ the front and rear parts $b$, $c$ are pushed with the aid of bearings or stiffening members $b'$ and $c'$ provided thereon. For fastening, some of the ribs $d$ at $l$ and the longitudinal sections $e$, $f$ at $m$ are detachably secured to the spar $a$.

As fastening means preferably serve pins and flanges or shear bolts and bores, or other suitable means. The means for connecting the brackets $i$ to the spar $a$ may be of any suitable type. Fig. 4 shows a connection effected by eyes and bolts.

The brackets $i$ can be used in a simple manner for attaching fuel tanks thereto or suspending bombs therefrom which when the front and rear parts $b$, $c$ are pushed into position will be covered by the ribs $d$ supporting the skins of these parts. Other installations may be made with equal facility, and the brackets $i$ can simultaneously act as supports for ailerons, landing flaps, slats, etc.

What is claimed is:

1. An aircraft wing, comprising a single closed hollow spar capable of resisting bending and twisting forces and constituting a homogeneous structural element extending over the entire length of the wing, a removable front wing part, a removable rear wing part, said parts extending transversely to said spar and completely enclosing said spar and having contacting surfaces forming a single seam upon the upper surface of the wing and a single seam upon the lower surface of the wing, each of said parts comprising a covering skin, sections firmly connected to an inner surface of said skin, and a bearing extending at a distance from said spar; brackets connected to the front of said spar, other brackets connected to the rear of said spar, an auxiliary support carried by the first-mentioned brackets in front of and at a distance from said spar and extending in the direction of said spar, another auxiliary support carried by said other brackets behind and at a distance from said spar and extending in the direction of said spar, the bearings of said front and rear wing parts engaging said auxiliary supports, whereby said auxiliary supports substantially carry said front and rear wing parts, and means carried by some of said sections for detachably connecting the same with said spar, whereby said front and rear wing parts are detachably connected with said spar.

2. An aircraft wing, comprising a single closed hollow spar capable of resisting bending and twisting forces and constituting a homogeneous structural element extending over the entire length of the wing, a removable front wing part, a removable rear wing part, said parts extending transversely to said spar and completely enclosing said spar and having contacting seam-forming surfaces, each of said parts comprising a covering skin, sections firmly connected to an inner surface of said skin, and a bearing extending at a distance from said spar; brackets situated in front of said spar, other brackets situated in the rear of said spar, said brackets being detachably connected to said spar at a few points thereof, an auxiliary support carried by the first-mentioned brackets in front of and at a distance from said spar and extending in the direction of said spar, another auxiliary support carried by said other brackets behind and at a distance from said spar and extending in the direction of said spar, the bearings of said front and rear wing parts engaging said auxiliary supports, whereby said auxiliary supports substantially carry said front and rear wing parts, said front and rear wing parts and said auxiliary supports being subdivided in the longitudinal direction of the wing into a plurality of separate comparatively short portions, and means carried by some of said sections for detachably connecting the same with said spar, whereby said front and rear wing parts are detachably connected with said spar.

3. An aircraft wing, comprising a single closed hollow spar capable of resisting bending and twisting forces and constituting a homogeneous structural element extending over the entire length of the wing, a removable front wing part, a removable rear wing part, said parts extending transversely to said spar and completely enclosing said spar and having contacting surfaces forming a single seam upon the upper surface of the wing and a single seam upon the lower surface of the wing, each of said parts comprising a covering skin, parallel longitudinal sections extending close to said spar and connected to an inner surface of said skin, and a bearing extending at a distance from said spar; brackets connected to the front of said spar, other brackets connected to the rear of said spar, an auxiliary support carried by the first-mentioned brackets in front of and at a distance from said spar and extending in the direction of said spar, another auxiliary support carried by said other brackets behind and at a distance from said spar and extending in the direction of said spar, the bearings of said front and rear wing parts engaging said auxiliary supports, whereby said auxiliary supports substantially carry said front and rear wing parts, and means carried by said sections for detachably connecting said sections at a few points to said spar, whereby said front and rear wing parts are detachably connected with said spar.

EMIL SCHELER.